US012687720B2

(12) United States Patent
Nishibe et al.

(10) Patent No.: US 12,687,720 B2
(45) Date of Patent: Jul. 21, 2026

(54) DISPLAY DEVICE, HEAD-MOUNT DISPLAY, AND IMAGE DISPLAY METHOD

(71) Applicant: SONY INTERACTIVE ENTERTAINMENT INC., Tokyo (JP)

(72) Inventors: Mitsuru Nishibe, Chiba (JP); Haruka Iwaki, Kanagawa (JP); Kuniaki Oe, Tokyo (JP); Takanori Minamino, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 322 days.

(21) Appl. No.: 18/354,675

(22) Filed: Jul. 19, 2023

(65) Prior Publication Data

US 2024/0036315 A1    Feb. 1, 2024

(30) Foreign Application Priority Data

Jul. 26, 2022    (JP) ................................. 2022-118845

(51) Int. Cl.
*G02B 27/01* (2006.01)

(52) U.S. Cl.
CPC ...... *G02B 27/017* (2013.01); *G02B 2027/011* (2013.01); *G02B 2027/0138* (2013.01); *G02B 2027/014* (2013.01); *G02B 2027/0185* (2013.01); *G02B 2027/0187* (2013.01)

(58) Field of Classification Search
CPC ............ G02B 27/017; G02B 2027/011; G02B 2027/0138; G02B 2027/014; G02B 2027/0185; G02B 2027/0187; G02B 27/0172; H04N 23/81; H04N 25/68; H04N 25/683
See application file for complete search history.

(56) References Cited

U.S. PATENT DOCUMENTS

| | | | |
|---|---|---|---|
| 6,593,961 B1 * | 7/2003 | Perino | H04N 25/68 348/E5.081 |
| 2006/0012695 A1 * | 1/2006 | Chang | H04N 25/68 348/E5.081 |
| 2007/0216786 A1 * | 9/2007 | Hung | H04N 25/68 348/E5.081 |
| 2008/0297629 A1 * | 12/2008 | Kitani | H04N 25/44 348/E9.037 |
| 2015/0193658 A1 * | 7/2015 | Miller | G06V 40/19 348/78 |
| 2016/0277694 A1 | 9/2016 | Lee et al. | |

(Continued)

FOREIGN PATENT DOCUMENTS

| | | |
|---|---|---|
| JP | 2005-223796 A | 8/2005 |
| WO | WO-2022123388 A1 | 6/2022 |

*Primary Examiner* — Jason A Flohre

(74) *Attorney, Agent, or Firm* — Kilpatrick Townsend & Stockton LLP

(57) ABSTRACT

Provided is a display device including a photographic image acquisition unit that acquires data regarding a photographic image to be displayed, a plurality of singular point detection units that each determine whether or not an allocated target pixel in the photographic image is a singular point which has an abnormal value, a plurality of correction units that each correct a pixel value by using values of adjacent pixels when the allocated target pixel is the singular point, and an output unit that outputs data regarding an image in which a pixel value of the singular point has been corrected, to a display panel.

20 Claims, 8 Drawing Sheets

(56)                References Cited

U.S. PATENT DOCUMENTS

2017/0078600 A1*  3/2017  Higuchi ............... H04N 25/683
2019/0318677 A1   10/2019  Lu et al.
2020/0145594 A1    5/2020  Lin et al.
2021/0099632 A1*   4/2021  Molholm .............. G06T 15/506
2022/0225956 A1    7/2022  Kunieda
2024/0311972 A1*   9/2024  Huang ...................... G06T 5/50
2024/0323557 A1*   9/2024  Zhu ...................... H04N 25/683

* cited by examiner

F I G . 5
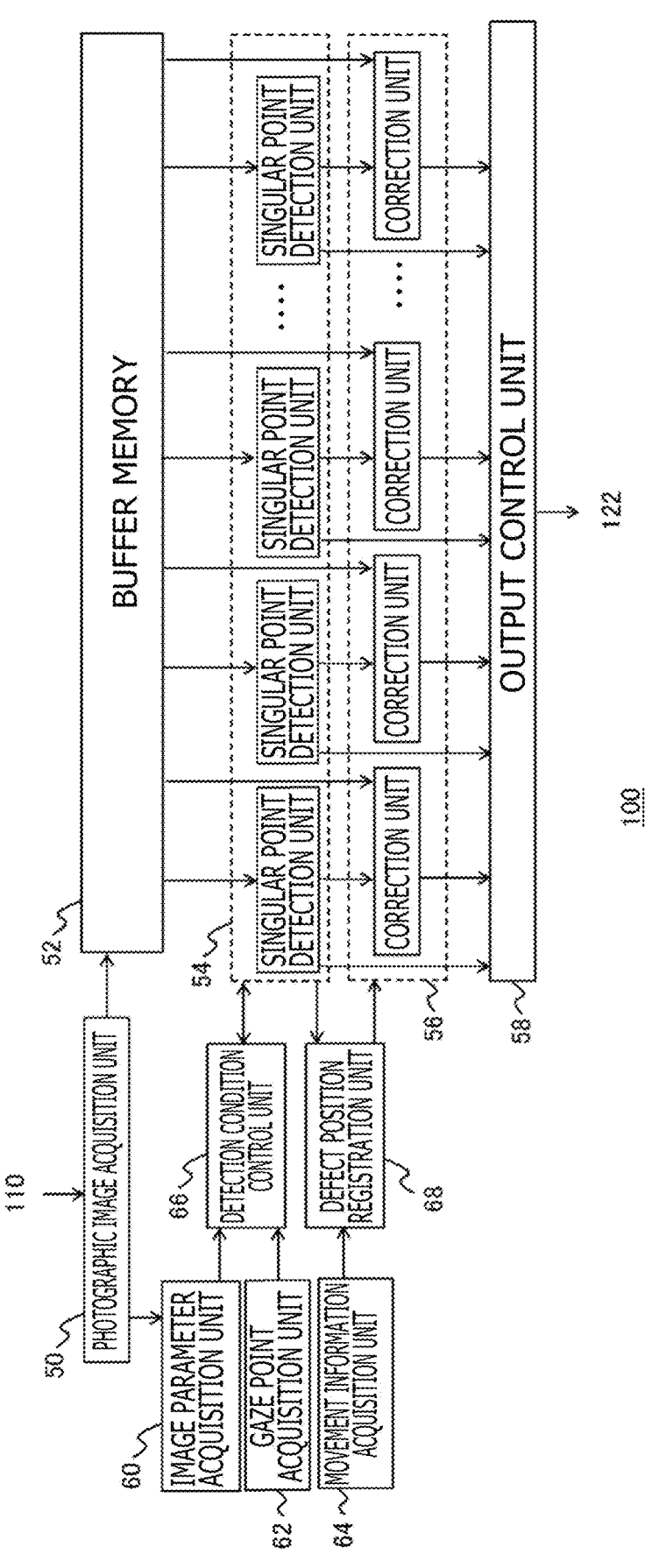

F I G . 1 0
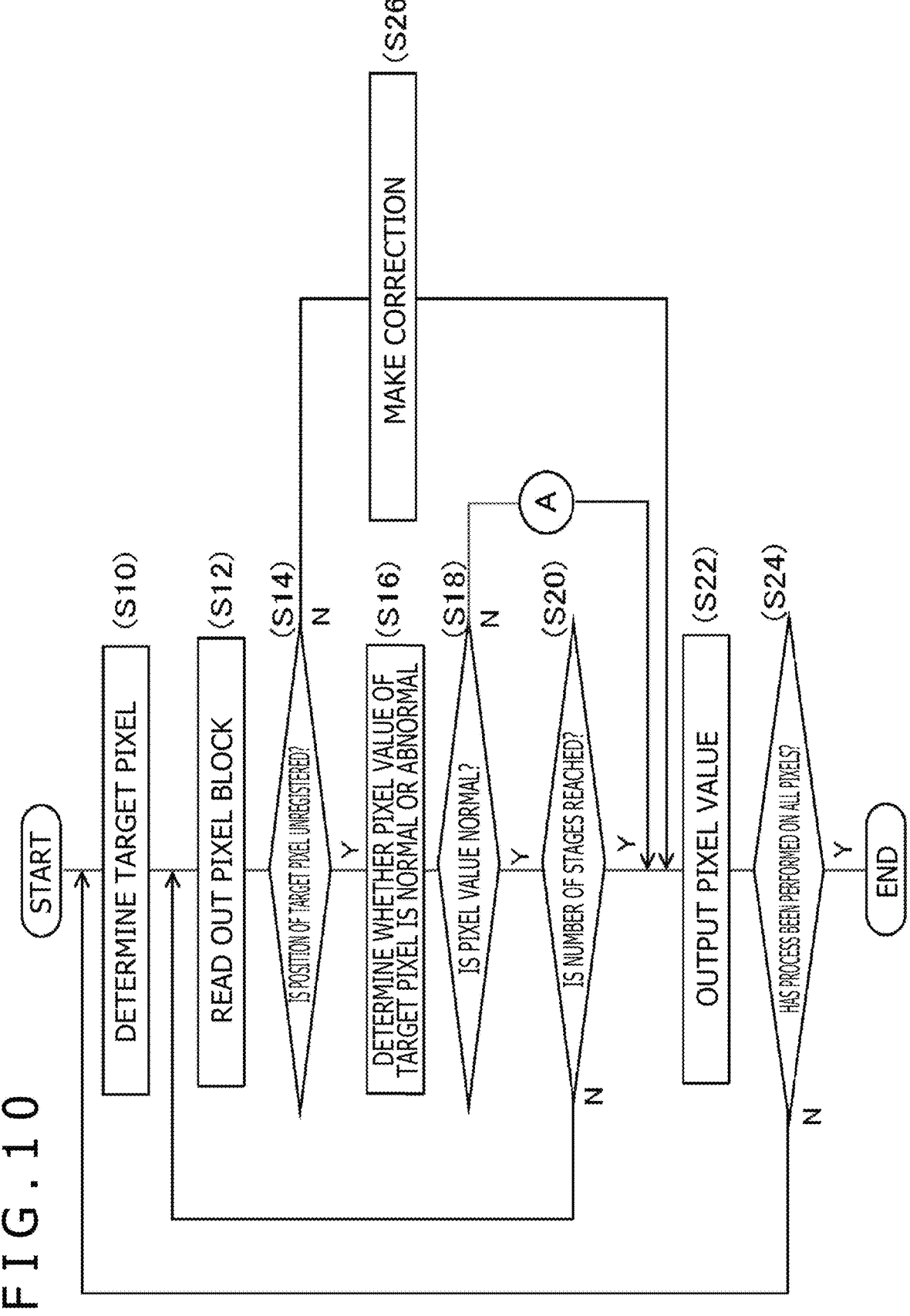

DISPLAY DEVICE, HEAD-MOUNT DISPLAY, AND IMAGE DISPLAY METHOD

CROSS REFERENCE TO RELATED APPLICATIONS

This application claims the benefit of Japanese Priority Patent Application JP 2022-118845 filed Jul. 26, 2022, the entire contents of which are incorporated herein by reference.

BACKGROUND

The present disclosure relates to a display device, a head-mount display, and an image display method for displaying images including photographic images.

In recent years, a technology of displaying and distributing images being photographed in real time has been widely used. For example, with a mechanism for displaying a photographic image in real time with a camera mounted on a head-mount display which may be a closed type, a user can look around the user even when the user is wearing the head-mount display. In addition, it is possible to implement augmented reality or mixed reality by superimposing graphics at a suitable position in a photographic image.

Due to a defective imaging element, for example, a singular pixel that does not express the true color may be generated in a photographic image. Therefore, in the field of electronic cameras, a wide variety of methods for performing signal processing to correct such defective pixels have been proposed (see Japanese Patent Laid-Open No. 2005-223796, for example).

SUMMARY

In order to depict a real space image in real time as if a user actually views the real space, a display device of any type has to correct a local defect with high precision. For example, a highest brightness point that appears in a dark room rendered on the image or a black point that appears in a bright outdoor area rendered on the image becomes conspicuous. These points are likely to deteriorate the impression of the entire image quality. Compared to a case where a recorded image is watched or an image is checked through an electronic finder of an imaging device, in a case where a photographic image equivalent to an image for viewing is displayed on a display device in real time, it is particularly necessary to increase the image quality while a resource amount for making corrections is large and a large restriction is imposed on a required time.

The present disclosure has been made in view of the abovementioned problems, and it is desirable to provide a technology of displaying a high-quality photographic image with a low delay irrespective of the resource amount in a display device.

In order to solve the abovementioned problems, a certain aspect of the present disclosure relates to a display device. The display device includes a photographic image acquisition unit that acquires data regarding a photographic image to be displayed, a plurality of singular point detection units that each determine whether or not an allocated target pixel in the photographic image is a singular point which has an abnormal value, a plurality of correction units that each correct a pixel value by using values of adjacent pixels when the allocated target pixel is the singular point, and an output unit that outputs data regarding an image in which a pixel value of the singular point has been corrected, to a display panel.

Another aspect of the present disclosure relates to a head-mount display. The head-mount display is the display device which includes a photographic image acquisition unit that acquires data regarding a photographic image to be displayed, a plurality of singular point detection units that each determine whether or not an allocated target pixel in the photographic image is a singular point which has an abnormal value, a plurality of correction units that each correct a pixel value by using values of adjacent pixels when the allocated target pixel is the singular point, and an output unit that outputs data regarding an image in which a pixel value of the singular point has been corrected, to a display panel, the head-mount display including a stereo camera that images a real space in front of the stereo camera, and a display panel that displays the photographic image before a user's eye.

Still another aspect of the present disclosure relates to an image display method. The image display method includes acquiring data regarding a photographic image to be displayed, parallelly determining whether or not target pixels, in the photographic image, allocated to respective execution subjects are singular points which have abnormal values, parallelly correcting a pixel value of the target pixel allocated to each execution subject, by using values of adjacent pixels when the allocated target pixel is the singular point, and outputting data regarding an image in which the pixel value of the singular point has been corrected, to a display panel.

It is to be noted that a method, a device, a system, a computer program, a data structure, or a recording medium that is obtained by translating a given combination of the above constituent elements or an expression in the present disclosure is also effective as an aspect of the present disclosure.

According to an embodiment of the present disclosure, a high-quality photographic image can be displayed with a low delay irrespective of the resource amount in a display device.

BRIEF DESCRIPTION OF THE DRAWINGS

FIG. 5 illustrates the configuration of functional blocks of the head-mount display according to the present embodiment;

FIG. 10 is a flowchart in which the head-mount display outputs data while correcting a singular point in a photographic image in the present embodiment.

DETAILED DESCRIPTION OF THE PREFERRED EMBODIMENT

Figure 1:
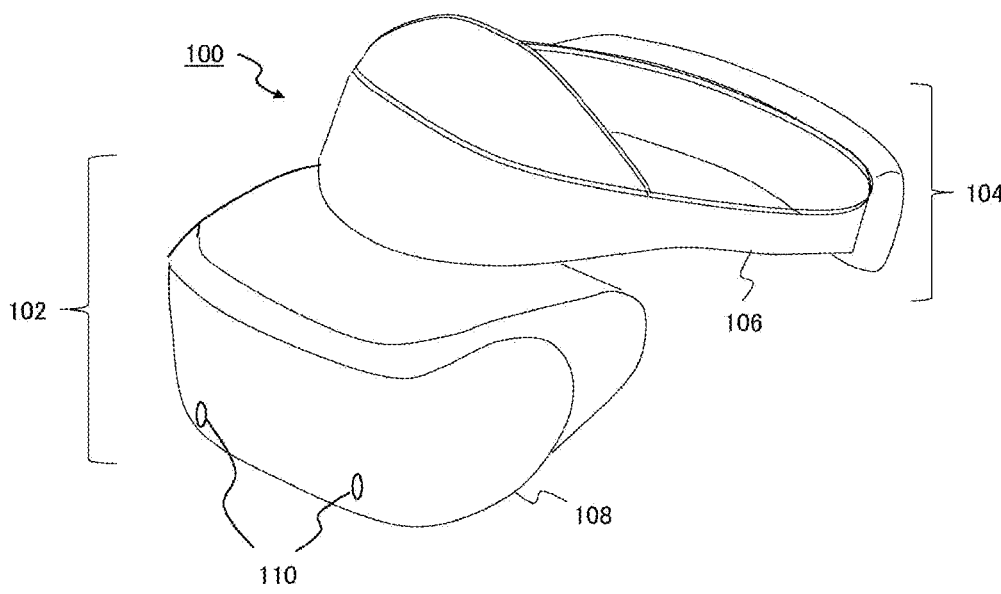
FIG. 1 illustrates an example of the appearance of a head-mount display according to a present embodiment.

The present embodiment relates to a device for displaying an image being photographed in real time. As long as the device is configured as described above, the type of a display device is not particularly specified. For example, a display device that is incorporated in a mobile terminal or an imaging apparatus may be adopted. In the following explanation, a head-mount display for which high image quality is desired will exemplify the display device. FIG. 1 illustrates an example of the appearance of a head-mount display 100. In this example, the head-mount display 100 is formed of an output structure part 102 and a fitting structure part 104. The fitting structure part 104 includes a fitting band 106 that surrounds the head of a user when worn by the user such that the device is fixed.

The output structure part 102 includes a casing 108 that is formed to cover left and right eyes when the user is wearing the head-mount display 100. A display panel that directly faces the eyes when the user is wearing the head-mount display 100 is included in the casing 108. Further, an ocular lens that is positioned between the display panel and the user's eyes when the user is wearing the head-mount display 100, and that depicts an enlarged image is included in the casing 108. The head-mount display 100 may further include a loudspeaker or an earphone at a position that corresponds to a user's ear when the user is wearing the head-mount display 100. In addition, the head-mount display 100 includes a motion sensor. The motion sensor detects translation movement or rotational movement of the head of the user wearing the head-mount display 100, and further, detects the position and the attitude at each clock time.

The head-mount display 100 further includes a stereo camera 110 on the front surface of the casing 108. The present embodiment provides a mode of displaying a video image being photographed by the stereo camera 110 with a minimum delay so that a real space in a direction that the user is facing is depicted. Such a mode is referred to as "see-through mode" hereinbelow. For example, the head-mount display 100 automatically enters the see-through mode when any content image is not displayed.

Accordingly, before and after content is executed or when content is halted, the user can check the surroundings without taking off the head-mount display 100. Besides, the see-through mode may be started or stopped when the user clearly performs an operation. Accordingly, even when watching content, the user can temporarily switch the content image to an image of the real space at a given timing, so that the user can perform a necessary operation of coping with an emergency event in the real space. It is to be noted that the stereo camera 110 illustrated in FIG. 1 is disposed on the lower portion of the front surface of the casing 108. However, the position of the stereo camera 110 is not limited to a particular position. In addition, any camera other than the stereo camera 110 may be disposed instead.

A photographic image taken by the stereo camera 110 can be used as a content image. For example, a virtual object is overlaid on the photographic image in such a way that the position, attitude, and motion of the virtual object are adjusted to a real object within the view field of the camera. Accordingly, augmented reality (AR) or Mixed Reality (MR) is implemented. Moreover, irrespective of whether the photographic image is displayed or not, the photographic image may be analyzed, and the analysis result may be used to determine the position, attitude, and motion of a rendered object.

For example, by stereo matching on the photographic image, a corresponding point of a subject image may be extracted and the distance to the subject may be obtained according to the principle of triangulation. Alternatively, the position and the attitude of the head-mount display 100 or the user's head with respect to the surrounding space may be obtained by a well-known technology such as Visual Simultaneous Localization and Mapping (SLAM). As a result of the abovementioned processes, a virtual world can be rendered and displayed within a field of view that is adjusted to the position of the viewing point or the gazing direction of the user.

Figure 2:
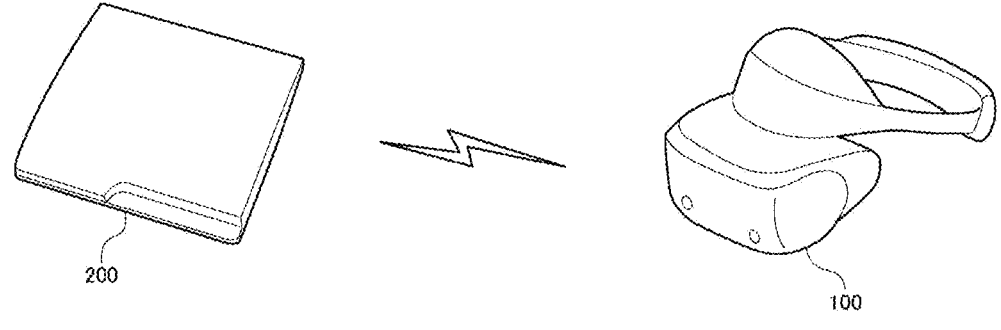
FIG. 2 is a configuration example of an image display system according to the present embodiment.

FIG. 2 illustrates a configuration example of an image display system according to the present embodiment. In an image display system 10, the head-mount display 100 is connected to a content processing device 200 via wireless communication or via an interface for establishing connection with a universal serial bus (USB) Type-C peripheral device. The content processing device 200 may be further connected to a server over a network. In this case, the server may provide an on-line application such as a game that a plurality of users can participate in over the network, to the content processing device 200.

The content processing device 200 is basically an information processing device that generates a display image by processing content, and transmits the display image to the head-mount display 100 to display the display image. The content processing device 200 typically identifies a view point or a sight direction on the basis of the position and the attitude of the head of a user wearing the head-mount display 100, and generates a display image within a view field corresponding to the view point or the sight direction. For example, the content processing device 200 generates an image expressing a virtual world which is the stage of an electronic game while proceeding with the game so that Virtual Reality (VR) is implemented.

Content to be processed by the content processing device 200 in the present embodiment is not particularly specified. AR or MR may be implemented, as described above, or a movie consisting of previously prepared display images may be processed. In the following explanation, "content image" refers to an image that is not a real-time image of a real space to be displayed in the see-through mode.

Figure 3:
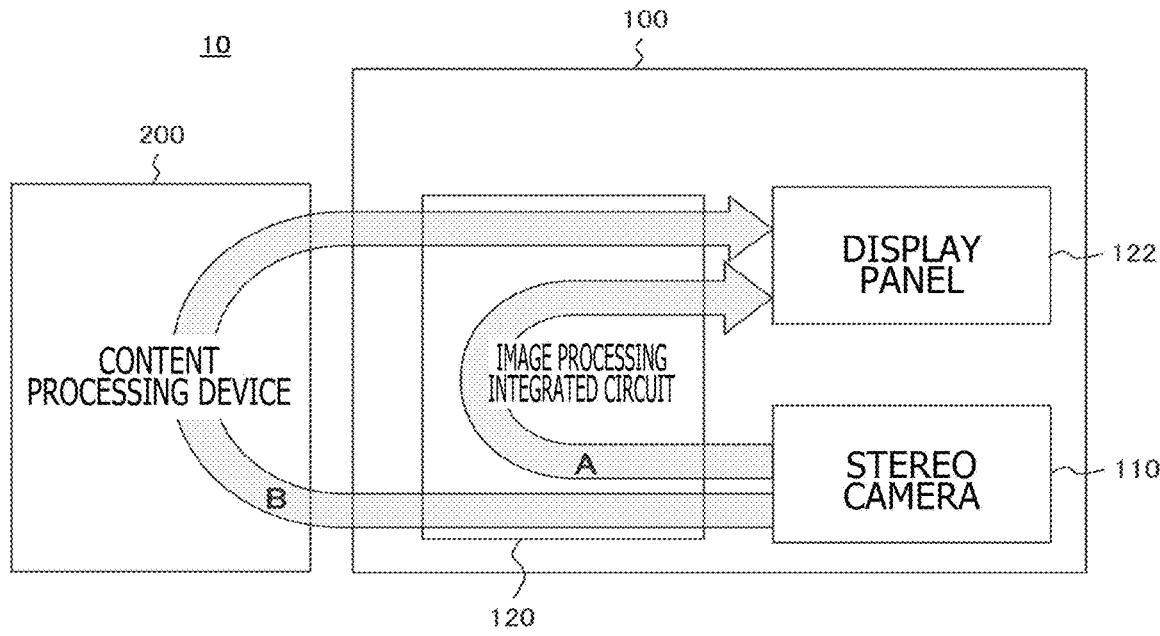
FIG. 3 schematically illustrates paths of data in the image display system according to the present embodiment.

FIG. 3 schematically illustrates paths of data in the image display system 10 according to the present embodiment. The head-mount display 100 includes a stereo camera 110 and the display panel 122, as previously described. The display panel 122 has a common display mechanism such as a liquid crystal display or an organic electroluminescence (EL) display. In the present embodiment, the display panel 122 displays a left-eye image and a right-eye image which constitute a frame of a video image, in a left region and a right region directly facing the left eye and the right eye of the user, respectively.

Stereo images having a parallax corresponding to the distance between the eyes are used as the left-eye image and the right-eye image. Accordingly, a rendered object looks three-dimensional. The display panel 122 may be formed of two panels: a left-eye panel and a right-eye panel which are disposed side by side, or may be formed of one panel that displays an image obtained by connecting a left-eye image and a right-eye image in the left-right direction.

The head-mount display 100 further includes an image processing integrated circuit 120. For example, the image processing integrated circuit 120 is a system on a chip on which a variety of functional modules including a central processing unit (CPU) are mounted. It is to be noted that the head-mount display 100 may further include a motion sensor such as a gyro sensor, an acceleration sensor, or an angular acceleration sensor, a main memory such as a dynamic random access memory (DRAM), an audio circuit for allowing a user to hear a sound, or a peripheral device interface circuit for establishing connection with a peripheral device, which are not illustrated in FIG. 3.

In FIG. 3, two possible paths of data to render an image obtained by the stereo camera 110 are indicated by arrows. To implement AR or MR, it is common to import an image obtained by the stereo camera 110 into a content processing subject, and combine the image with a virtual object to generate a display image. In the image display system 10 in FIG. 3, the content processing subject is the content processing device 200. Therefore, an image obtained by the stereo camera 110 is transmitted to the content processing device 200 through the image processing integrated circuit 120, as indicated by an arrow B.

Then, a virtual object is superimposed on the image, and the resultant image is returned to the head-mount display 100, and is displayed on the display panel 122. On the other hand, under the see-through mode, an image obtained by the stereo camera 110 is corrected to a suitable display image by the image processing integrated circuit 120, and the corrected image is displayed on the display panel 122, as indicated by an arrow A. The path indicated by the arrow A has a data transmission path length much shorter than the path indicated by the arrow B. Thus, according to the path indicated by the arrow A, a time period between image capturing to image displaying can be shortened, and further, consumption power for data transmission can be reduced.

However, the present embodiment is not intended to limit the path of data in the see-through mode to the arrow A. That is, the path indicated by the arrow B may be adopted such that an image taken by the stereo camera 110 is transmitted to the content processing device 200. Then, the image may be corrected to a display image at the content processing device 200 side, and then, the display image may be returned to the head-mount display 100 and be displayed.

In either case, it is preferable in the present embodiment that a photographic image obtained by the stereo camera 110 is pipelined line by line, which is a unit smaller than one frame, so that a time period taken to display the image is minimized. Accordingly, the possibility that the user feels uncomfortable or feels visually induced motion sickness because a video is displayed with a delay with respect to movement of the head part, can be reduced.

In order to implement the see-through mode or AR/MR in the image display system 10 described so far without giving uncomfortability to the user, it is required to process an image taken by the stereo camera 110 as fast as possible and output the image with a low delay. Meanwhile, in a case where a defect occurs in any one of imaging elements constituting the image sensor of the stereo camera 110 or in a line for reading pixel values, the value of the pixel corresponding to the defect becomes abnormal to generate a singular point in a display image.

In common imaging devices, an image signal processor (ISP) appropriately corrects a RAW image outputted from an image sensor, and then, outputs the corrected image. On the other hand, in the head-mount display 100, it is necessary to simultaneously perform a variety of processes of displaying a photographic image, conducting an image analysis, exchanging data with the content processing device 200, generating a distortion image for an ocular lens, etc. Therefore, the load on resources is likely to be increased.

In particular, head-mount displays or mobile terminals which have been desired to be light and compact have limited data transmission paths due to a circuit mounting space and wiring arrangement on a substrate. This may limit resources usable for one processing. However, not only in AR/MR which uses a photographic image as a content image, but also in the see-through mode, the photographic image needs to be displayed with high definition, particularly to enlarge the image with an ocular lens.

According to the present embodiment, detection and correction of an abnormal pixel value are locally completed so that an image can be displayed with a low delay while the effect on the overall image quality is minimized. In addition, a detection condition is adaptively adjusted so that a truly abnormal pixel value can be detected with high precision even if such local processing is performed. Hereinafter, a point in a photographic image where a pixel value is abnormal due to a malfunction in an imaging element, or a point that does not depict a true image is referred to as a "singular point." One singular point includes one pixel, or of a plurality of pixels located in consecutive positions.

Figure 4:
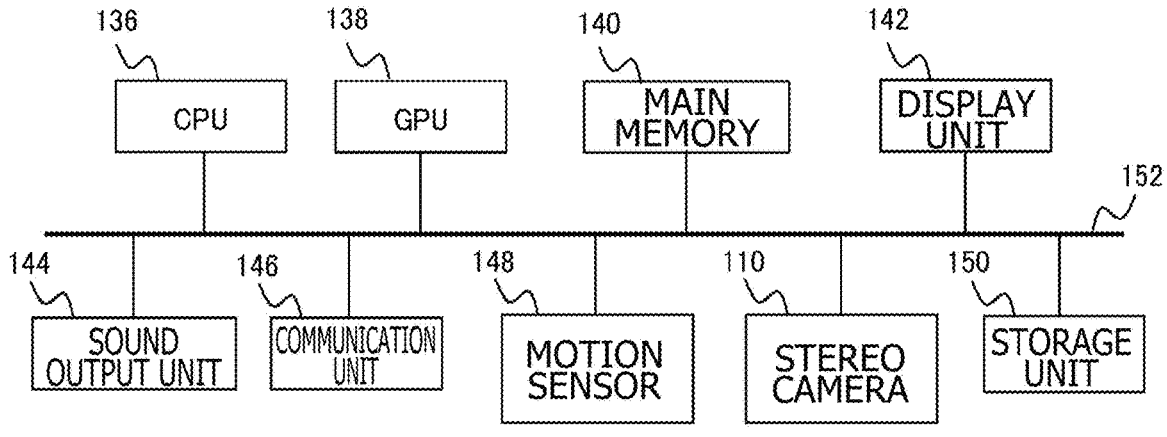
FIG. 4 illustrates an internal circuit configuration of the head-mount display according to the present embodiment.

FIG. 4 illustrates an internal circuit configuration of the head-mount display 100. The head-mount display 100 includes a CPU 136, a graphics processing unit (GPU) 138, a main memory 140, and a display unit 142. These units are mutually connected via a bus 152. Further, a sound output unit 144, a communication unit 146, a motion sensor 148, the stereo camera 110, and a storage unit 150 are connected to the bus 152. It is to be noted that the configuration of the bus 152 is not limited. For example, the bus 152 can be realized by connecting a plurality of buses via an interface.

The CPU 136 generally controls the head-mount display 100 by executing an operating system stored in the storage unit 150. Further, the CPU 136 executes a program read out from the storage unit 150 and loaded into the main memory 140, or a program downloaded via the communication unit 146. The GPU 138 executes rendering and correction in accordance with a rendering command supplied from the CPU 136. The main memory 140 is formed of a random access memory (RAM) and is configured to store programs and data that are required for processes.

The display unit 142 includes the display panel 122 which is illustrated in FIG. 3, and is configured to display an image before the eyes of a user who is wearing the head-mount display 100. The sound output unit 144 is formed of a loudspeaker or an earphone that is provided at a position corresponding to an ear of the user who is wearing the head-mount display 100. The sound output unit 144 makes the user hear a sound.

The communication unit 146 is an interface for exchanging data with the content processing device 200, and performs communication by a known wireless communication technology (e.g. Bluetooth (registered trademark)) or a known wired communication technology. The motion sensor 148 includes a gyro sensor, an acceleration sensor, an angular acceleration sensor, etc. The motion sensor 148 acquires the tilt, the acceleration, the angular acceleration, etc. of the head-mount display 100. The stereo camera 110 is formed of a pair of video cameras that image a surrounding real space from left and right viewpoints, as illustrated in FIG. 1. The storage unit 150 is formed of a storage such as a read only memory (ROM).

FIG. 5 illustrates the configuration of functional blocks of the head-mount display 100 according to the present embodiment. From the perspective of hardware, the illustrated functional blocks are implemented by the circuit configuration illustrated in FIG. 4. From the perspective of software, the functional blocks are implemented by programs that are loaded from the storage unit 150 into the main memory so as to exhibit a data input function, a data hold function, an image processing function, a communication function, etc. Therefore, a person skilled in the art will understand that these functional blocks can be implemented in many different ways by hardware, by software, or a combination thereof, and that the way for implementing the functional blocks is not limited to a particular one.

In the head-mount display 100 in FIG. 5, the functional blocks excluding the stereo camera 110 and the display panel 122 can be included in the image processing integrated circuit 120 in FIG. 3. The head-mount display 100 includes a photographic image acquisition unit 50 that acquires data regarding a photographic image, a buffer memory 52 that temporarily saves the data regarding the photographic image, singular point detection units 54 that detect a singular point, correction units 56 that correct the pixel value of a singular point, and an output control unit 58 that outputs data regarding the photographic image having been corrected, if needed.

The head-mount display 100 further includes an image parameter acquisition unit 60 that acquires a prescribed parameter concerning a characteristic of a photographic image, a gaze point acquisition unit 62 that acquires information regarding a user gaze point, a movement information acquisition unit 64 that acquires information concerning movement of the head-mount display 100, a detection condition control unit 66 that controls a condition for detecting a singular point, and a defect position registration unit 68 that identifies and registers the position of a pixel which is considered to be defective.

The photographic image acquisition unit 50 acquires data regarding a photographic image from an image sensor of the stereo camera 110, and stores the data into a buffer memory 52. The photographic image acquisition unit may additionally acquire a prescribed parameter concerning a characteristic of the photographic image, such as a gain value that is used to perform analog-to-digital (AD) conversion of a pixel value in the image sensor. Further, the photographic image acquisition unit may perform necessary processes such as demosaicing and color tone correction on the acquired photographic image data. The buffer memory 52 temporarily saves data regarding pixel values of at least a prescribed number of rows in the photographic image.

The singular point detection unit 54 reads out data regarding a pixel block having a prescribed size from the buffer memory 52, and determines the presence/absence of a singular point. The singular point detection unit 54 basically compares the value of a target pixel with the values of pixel groups (hereinafter, referred to as "adjacent pixels") surrounding and adjoining the target pixel, and determines that the target pixel is a singular point when a condition for regarding the value of the target pixel as an abnormal value is satisfied. For example, the singular point detection unit 54 defines a target pixel normal range by using the values of the adjacent pixels, and then, determines that the target pixel is a singular point if the actual value of the target value is outside the normal range. Therefore, the singular point detection unit 54 reads out a pixel block as a unit, which includes the target pixel and the adjacent pixels thereof, from the buffer memory 52.

If the target pixel is not a singular point, the singular point detection unit 54 supplies the pixel value of the target pixel and the position coordinates of the target pixel to the output control unit 58. When determining that the target pixel is a singular point, the singular point detection unit 54 supplies the position coordinates of the target pixel and data regarding the adjacent pixels to the correction unit 56.

The correction unit 56 corrects the value of a target pixel that has been determined as a singular point. The correction unit 56 basically compensates the value of the target pixel with a pixel value similar to those of the surrounding pixels so that the defect is made inconspicuous in the displayed image. A computation method for the correction to achieve this effect is not particularly specified. For example, the correction unit 56 adopts, for the target pixel, the average value of the pixel values of all or some of the adjacent pixels. Simplified computation leads to shortening of a time required to make the correction. However, a new pixel value is determined on the basis of the values of two or more of the adjacent pixels, whereby repetition of a singular point or noise can be inhibited. The correction unit 56 supplies the determined pixel value and the position coordinates of the target pixel to the output control unit 58.

The singular point detection unit 54 sequentially defining, as a target pixel, all pixels in the photographic image, and makes the determination on each of the target pixels, and the correction unit 56 makes the correction, if needed. These processes can be performed separately for each target pixel. Therefore, a plurality of the singular point detection units 54 and a plurality of the correction units 56 may be provided in pairs, as illustrated in FIG. 5, and respective target pixels may be allocated to the pairs such that the target pixels are parallelly processed. In order to perform such parallel processing at high speed, it is preferable to install the function of the singular point detection unit 54 and the function of the correction unit 56 into the GPU 138 or a visual processing unit (VPU) (not illustrated). The GPU 138 or the VPU creates a plurality of execution subjects (processes), and sequentially allocates target pixels to the execution subjects to parallelly process the target pixels. As a result, for example, one million pixels can be processed within 500 microseconds.

The output control unit 58 forms a display image by acquiring data regarding a pixel determined to be not a singular point from the singular point detection unit 54 and acquiring corrected data regarding a pixel determined to be a singular point, and then outputs the display image to the display panel 122. The output control unit 58 may create a display image by correcting the photographic image so as to cancel a distortion aberration and a chromatic aberration in such a way that a distortion-eliminated image can be viewed through an ocular lens. Besides, the output control unit 58 may perform various types of data conversion suited for the display panel 122.

It is to be noted that the output control unit 58 may transmit data regarding the photographic image in which a singular point has been corrected to the content processing device 200. In this case, the content processing device 200 may create a content image for AR/MR by rendering a virtual object in a suitable position on the photographic image, and return the content image to the head-mount display 100. The output control unit 58 may acquire data regarding this image, appropriately correct or transform the image, and output the corrected/transformed image to the display panel 122.

The detection condition control unit 66 optimizes a singular point detection condition in accordance with an original characteristic of the photographic image or a determination result obtained by the singular point detection unit 54. On the basis of a gain value given to the photographic image, which is an example of the abovementioned original characteristic of the photographic image, the detection condition control unit 66 changes a condition for determining that a pixel value is abnormal. Basically, a singular point becomes conspicuous when the gain value is great because the difference from another pixel is amplified. In other words, when the gain value is small, a singular point is inconspicuous without being corrected. Thus, a range for determining an abnormal value is narrowed (a condition for determining a normal value is mitigated). As a result, unnecessary correction is avoided, and the possibility that a normal pixel value is erroneously determined as an abnormal value is reduced.

In order to achieve that, the image parameter acquisition unit 60 acquires a prescribed parameter value concerning a characteristic such as a gain value of the photographic image from the photographic image acquisition unit 50, and supplies the parameter value to the detection condition control unit 66. Parameters to be acquired by the image parameter acquisition unit 60 are not limited to gain values. Any parameter may be acquired as long as the parameter has an effect on the conspicuity of a singular point. For example, the image parameter acquisition unit 60 may acquire a parameter that the photographic image acquisition unit 50 has used for color tone correction or data conversion.

Variation of a parameter concerning a photographic image and variation of the conspicuity of a singular point, and further the correspondence between the variations and a preferable singular point detection condition is obtained in advance by experiment or the like. The detection condition control unit 66 holds data regarding the variations and the correspondence, and controls the detection condition on the basis of an actually acquired parameter.

In an example for optimizing the detection condition according to a determination result obtained by the singular point detection unit 54, the detection condition control unit 66 adjusts the range of adjacent pixels to be used for a determination, or the range of a pixel block, in view of the possibility that target pixels located in consecutive positions constitute a singular point. In a case where a target pixel has an abnormal value and adjacent pixels, which are to be compared with the target pixel, also have an abnormal value, the abnormality of the target pixel may be missed because the difference between these abnormal values is small. On the other hand, in a case where the values of consecutive pixels including a target pixel is greatly different from the values of the other pixels but the consecutive length is somewhat long, it is highly possible that the target pixel is not abnormal and depicts a true image.

For this reason, the detection condition control unit 66 performs control to expand the range of the pixel block of a target pixel that has been determined to be not abnormal as a result of the first determination made by the singular point detection unit 54, and to make the second (or more) determination on the target pixel. In this case, the singular point detection unit 54 may evaluate, through the first time determination, the possibility that any one of the adjacent pixels also has an abnormality in accordance with a prescribed rule, and the detection condition control unit 66 may perform control to make the second (or more) determination if the possibility is high.

In a case where two or more pixels each having an abnormal values are consecutively located, the values of the two or more pixels can be detected as abnormal values by comparison with a new group of adjacent pixels surrounding the two or more pixels. An upper limit value of the number of times of expanding the pixel block range is set. Accordingly, pixels which seem to have abnormal values but have a somewhat long consecutive length and which are highly likely to depict a true image can be prevented from being corrected, and a trouble that the true image is deleted can be avoided.

The detection condition control unit 66 may further control a region in which a singular point is detected in the photographic image. One of known visual properties of human beings is that a visual function weakens as the distance from a gaze region, in a visual field, corresponding to a fovea increases. Therefore, when a singular point is generated in a position at a distance from a user gaze point in an image being displayed on the display panel 122, the singular point is blurred and is not noticeable. Therefore, the detection condition control unit 66 acquires information regarding the user gaze point at a prescribed rate, defines a singular point detection region in accordance with the information, and then, reports the defined region to the singular point detection unit 54.

As a result, the singular point detection unit 54 defines a target pixel within the reported region, and determines whether or not the pixel value thereof is abnormal. It goes without saying that the correction unit 56 makes a correction within this region. In this case, the gaze point acquisition unit 62 is formed of a gaze point detector (not illustrated), and acquires, at a prescribed rate, a user gaze point on an image being displayed on the display panel 122. A common detector can be used as the gaze point detector. For example, a detector configured to obtain a gaze point by applying infrared rays to a user's eye, imaging reflection light of the infrared rays, and identifying the direction of the eyeball, may be used.

In the present embodiment, the gaze point detector is disposed in the head-mount display 100 so as to face a user's eye. The gaze point acquisition unit 62 sequentially supplies the position coordinates of a gaze point on the display image to the detection condition control unit 66. Each time the gaze point is updated, the detection condition control unit 66 defines, as a singular point detection region, a region of a prescribed size centered around the gaze point. In this case, when the gaze point moves, the detection region also moves.

In another example, with the head-mount display 100, the user normally faces the direction of the visual line. That is, the visual line is likely to be linked with the display visual field, and thus, a gaze point is highly likely to be concentrated on the center of the display image. Therefore, the detection condition control unit 66 may define, as a singular point detection region, a region of a prescribed size based on a position on the photographic image corresponding to the center of the display image. In this case, the function of the gaze point acquisition unit 62 can be omitted.

The defect position registration unit 68 monitors, on a plane of the photographic image, a position where a singular point has occurred throughout a plurality of frames, and identifies the position of a defective imaging element in the image sensor of the stereo camera 110. In many cases, a singular point is caused by a defect in an imaging element. In this case, the singular point is continuously generated in the same position on the photographic image. When the position of a pixel where a defect is considered to have a defect is identified and registered, a determination to be made by the singular point detection unit 54 can be omitted because a pixel value still can be corrected.

For the above reason, the defect position registration unit 68 collects, for a prescribed time period, singular point detection results obtained by the singular point detection unit 54, and identifies, as a defect position, the position of a pixel continuously determined as a singular point or determined as a singular point with at least a prescribed frequency. The defect position registration unit 68 registers data regarding the identified defect position into the main memory 140 and the storage unit 150. After the defect position is registered, the correction unit 56 checks the registered data, determines a pixel in the position as a target pixel, reads out data regarding the adjacent pixels directly from the buffer memory 52, and makes a correction on the target pixel. The abovementioned correction method can be used in this case.

When a correction target is determined in view of the continuity, a pixel that has an unexpected extreme value due to the intensity of light in a real space, for example, can be prevented from being erroneously determined as a singular point or being corrected. In addition, since the process that is performed by the singular point detection unit 54 can be omitted, a total required processing time period can be shortened.

It is to be noted that, once a defect position is registered, the following correction may be made only on a pixel located in the registered position, or the singular point detection may be added by the singular point detection unit 54 with a prescribed frequency. In the latter case, when a new defect position is determined, the position is additionally registered. In a case where the registered defect position is not determined as a singular point any more, the defect position is eliminated from the registered data because there is a possibility that the registered position is not a defect position.

Meanwhile, with some arrangement, materials, or intensity of a lighting or a real object in the real space, a real image may look like a singular point. In order to prevent this image from being erroneously registered as a defect position, the defect position registration unit 68 may collect the singular point detection results only when the visual field of the stereo camera 110 is changing. In a case where the singular point does not move when the visual field is changing, the singular point is considered to be caused by a defect in an imaging element. In this example, the movement information acquisition unit 64 is formed of the motion sensor 148. The movement information acquisition unit 64 measures the angular velocity or the speed of the head-mount display 100 (and the stereo camera 110), and reports the measured angular velocity or speed to the defect position registration unit 68 at a prescribed rate.

Alternatively, the movement information acquisition unit 64 identifies the angular velocity or the speed of the head-mount display 100 (and the stereo camera 110) by analyzing the photographic image or obtaining the interframe difference, for example. In either case, the defect position registration unit 68 collects information regarding the positions of singular points detected when the head-mount display 100 and the stereo camera 110 are moving and the visual field of the photographic image is considered to be changing, and the defect position registration unit 68 identifies, as a defect position, the position of a singular point that remains in the same position even when an image in the photographic image is moving. It is to be noted that processing similar to the above can be performed by not only a head-mount display but also by a mobile terminal or any device being equipped with an imaging unit such as a camera and being capable of identifying a visual field change.

The region within which a defect position is acquired by the defect position registration unit 68 may be limited to a region of a prescribed size including a gaze point. For example, if the detection condition control unit 66 limits the defect position detection region is limited on the basis of a gaze point, a defect position within the region is necessarily acquired. Alternatively, the defect position registration unit 68 may perform initial processing of performing singular point detection on every region in the photographic image and registering a defective position, and then, the detection condition control unit 66 may additionally perform singular point detection only in a limited region from a gaze point.

Figure 6:
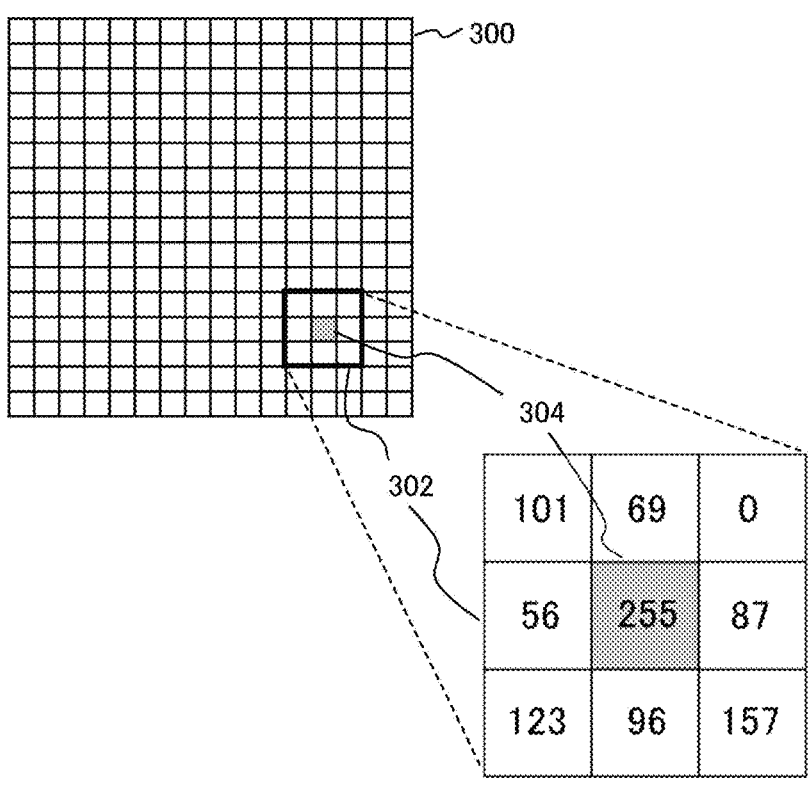
FIG. 6 is a diagram for explaining an example in which a singular point detection unit detects a singular point in the present embodiment.

FIG. 6 is a diagram for explaining a method in which the singular point detection unit 54 detects a singular point. A photographic image 300 is schematically illustrated on the upper left side of FIG. 6. Each minimum rectangular unit divided by a grid represents a pixel. The singular point detection unit 54 determines one target pixel 304 among the pixels, and reads out a pixel block 302 consisting of the target pixel 304 and the adjacent pixels, from the buffer memory 52.

Subsequently, the singular point detection unit 54 acquires the maximum value max and the minimum value min of the pixel values of the adjacent pixels. The singular point detection unit 54 determines that the pixel value p of the target pixel 304 is a normal value if the pixel value p satisfies $\min \leq p \leq \max$, and determines that the pixel value p is an abnormal value if the pixel value p does not satisfy the expression.

In the example in FIG. 6, the pixel value p of the target pixel 304 is 255, and the maximum value max and the minimum value min of the pixel values of the adjacent pixels are 157 and 0, respectively, which are largely depicted on the lower right side in the drawing. The pixel value p is determined as an abnormal value. In this case, the singular point detection unit 54 supplies the position coordinates of the target pixel 304 and the pixel values of the adjacent pixels to the correction unit 56. For example, the correction unit 56 calculates the average pixel value of four pixels that are vertically and horizontally adjacent to the target pixel 304, and adopts the average pixel value as the pixel value of the target pixel 304. In FIG. 6, "77" which is the average value of the four pixel values (69, 56, 87, 96) is adopted as the pixel value of the target pixel 304.

When the pixel value p of the target pixel is determined as a normal value because the pixel value p satisfies the above expression, the singular point detection unit 54 supplies data regarding this target pixel to the output control unit 58. Accordingly, the original data regarding the target pixel is used for a display process. It is to be noted that the present embodiment is not intended to be limited to the illustrated example in which a 3×3 pixel block centered about the target pixel is used for the determination. For example, the range of the pixel block may be expanded to the outside such that the singular point detection unit 54 uses a 5×5 pixel block for the determination. The singular point detection unit 54 may make the determination multiple times while expanding the range of the pixel block, as previously explained.

In addition, the correction method for addressing a target pixel determined as an abnormal value is not limited. For example, the range and number of adjacent pixels that are used to make an abnormal value determination may be identical to the range and number of adjacent pixels, or may be different from those of adjacent pixels. In addition, after an outlier is excluded from the pixel values of the adjacent pixels by a statistical process, the average value may be calculated to be used as the value of the target pixel. Alternatively, the value of the target pixel value may be determined by applying a smoothing filter such as a bilateral filter may to the pixel block. It is to be noted that, when the calculation method is simplified or less input values are used for the calculation, the time period required for the correction becomes shorter.

Unlike common noise reduction filters such as a median filter and a gaussian filter, the present method locally makes a correction by using the values of pixels in a limited range. Therefore, an effect on the original image resolution can be suppressed. Moreover, the present method has an advantage over the common noise reduction filters because the effect of dithering of intendedly adding noise to a photographic image is not negated.

Figure 7:
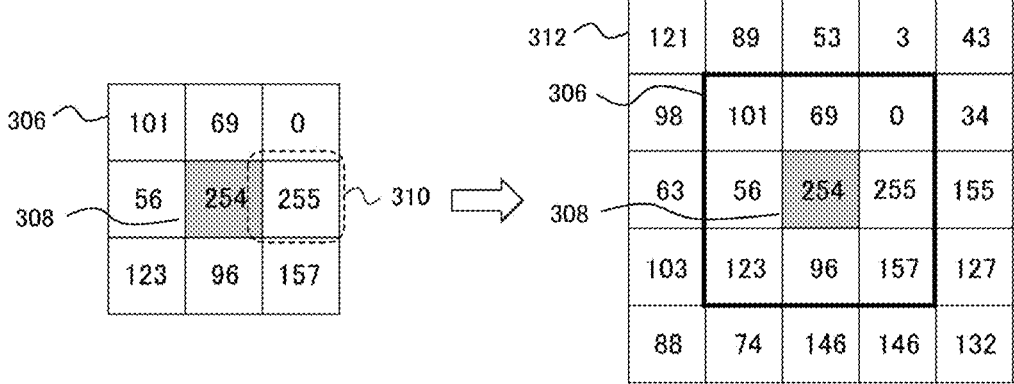
FIG. 7 is a diagram for explaining an example in which, to determine whether a certain target pixel is normal or abnormal, a detection condition control unit gradually changes the range of a pixel block for use in the present embodiment.

FIG. 7 is a diagram for explaining an example in which the detection condition control unit 66 gradually changes the range of a pixel block for use to determine whether a certain target pixel is normal or abnormal. A 3×3 pixel block 306 centered around a target pixel 308 in a photographic image, which is similar to that in FIG. 6, is depicted on the left side of FIG. 7. FIG. 7 is on the assumption that both the target pixel 308 and an adjacent pixel 310 are abnormal. In this case, in accordance with the abovementioned condition, the value of the target pixel 308 is determined as a normal value because the pixel 310 of the adjacent pixels also has a singular value.

To this end, for example, the detection condition control unit 66 controls the singular point detection unit 54 to use the 3×3 pixel block 306 for the first determination, and to, if the pixel value of the target pixel 308 is determined as a normal value, use a 5×5 pixel block 312, which is obtained by expanding the pixel block 306 to the upper, lower, left, and right sides, to make the second determination. In the second determination, the singular point detection unit 54 acquires the maximum value max and the minimum value min of the pixel values of the added outermost pixels, for example, and then, determines whether or not the pixel value of the target pixel 308 is normal in accordance with the abovementioned condition.

In the example in FIG. 7, the pixel value p of the target pixel 308 is 254 and the maximum value max and the minimum value min of the pixel values of the outermost pixels are 155 and 3, respectively. Accordingly, the pixel value p is determined as an abnormal value. In this case, the correction unit 56 adopts, as the value of the target pixel, the average pixel value of all or some of the outermost adjacent pixels, for example. Alternatively, the singular point detection unit 54 may acquire the second largest pixel value $max_{2nd}$ and the second smallest pixel value $min_{2nd}$ of the values of the all the adjacent pixels forming the double layers surrounding the target pixel 308, and may use the acquired values to determine whether the value of the target pixel is normal.

Specifically, the pixel value p of the target pixel 308 is determined as a normal value if the pixel value p satisfies $min_{2nd}$ p $max_{2nd}$, while the pixel value p is determined as an abnormal value if the pixel value p does not satisfy the expression. In the example in FIG. 7, the pixel value p of the target pixel 308 is 254 and the second largest value $max_{2nd}$ and the second smallest value $min_{2nd}$ of the pixel values of the adjacent pixels are 157 and 3, respectively. Accordingly, the pixel value p is determined as an abnormal value. In this case, the correction unit 56 adopts, as the value of the target pixel, the average pixel value of all or some of the adjacent pixels excluding the pixels having the maximum value and the minimum value, for example.

The range of the pixel block is changed by two steps in FIG. 7, but the range of the pixel block may be changed by three or more steps. When the range is wide, the possibility that a pixel that has a singular pixel value indicates a true image and the singular point is not caused by a defect in an imaging element is increased. For this reason, it is preferable to perform the two-step expansion depicted in FIG. 7 so as to prevent a normal value from being subjected to unnecessarily repetition of the determination, and prevent erroneous correction of a pixel that has a singular value but indicates a true image.

It is to be noted that, in the first determination using the pixel block 306, the detection condition control unit 66 may evaluate a possibility that there are consecutive abnormal pixels, and determine whether or not to make the second determination according to the result of the first determination. For example, the detection condition control unit 66 compares the difference between the maximum value max and the minimum value min of the pixel values of the adjacent pixels with a threshold value in the first determination, and performs control to make the second determination if the difference is greater than the threshold value.

In the example in FIG. 7, the difference between the maximum value max and the minimum value min in the pixel block 306 is large to be "255" because the pixel 310 has a large value. The detection condition control unit 66 compares the difference with the threshold value, and performs to the second determination. As a result of the illustrated multiple-step determinations, it is turned out that not only the target pixel 308 but also the pixel 310 has an abnormal value. Then, the correction unit 56 may correct the pixel value of the abnormal pixel 310 in addition to the pixel value of the target pixel 308.

Figure 8:
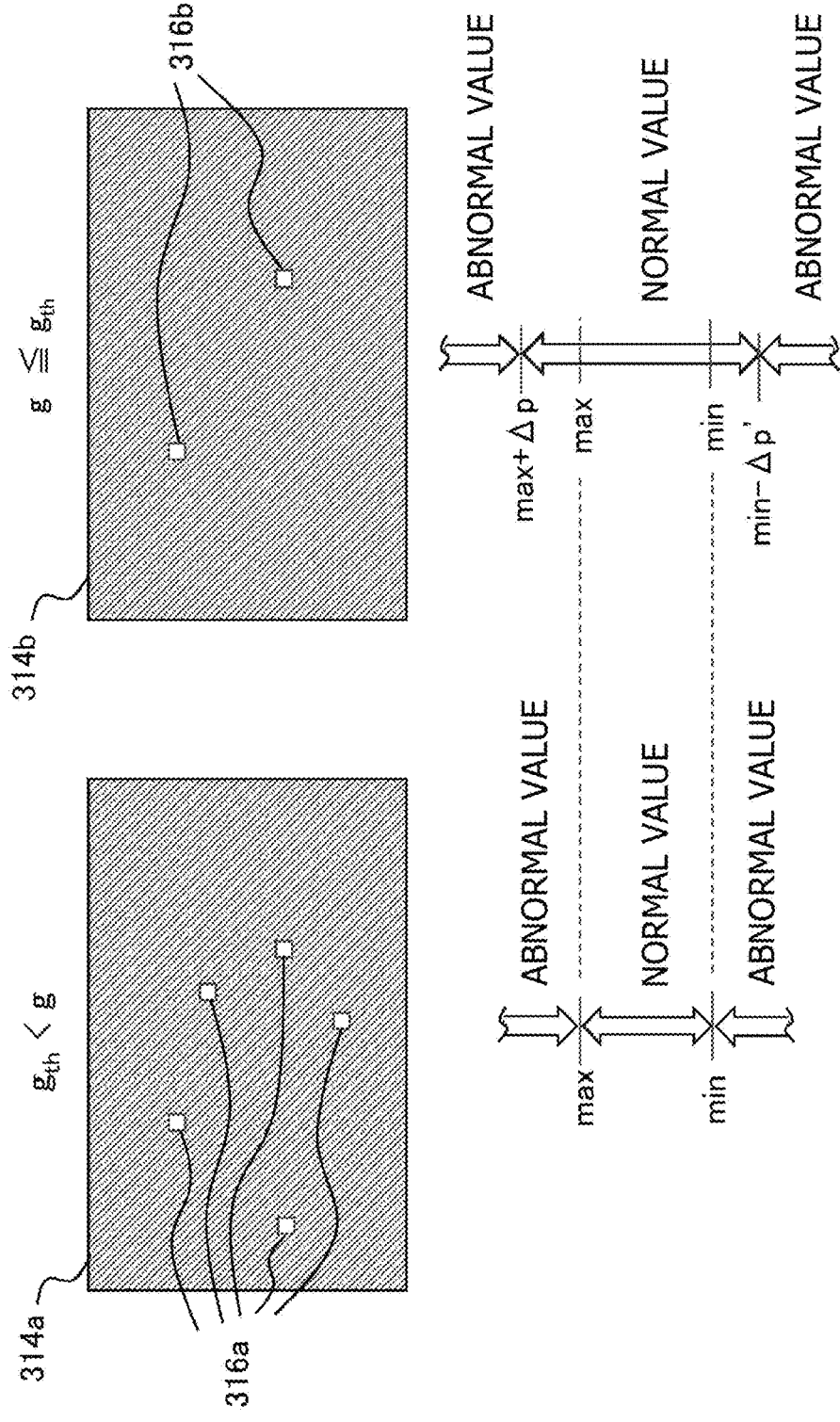
FIG. 8 is a diagram for explaining an example in which the detection condition control unit gradually changes a detection condition on the basis of a gain value given to a photographic image in the present embodiment.

FIG. 8 is a diagram for explaining an example in which the detection condition control unit 66 gradually changes a detection condition on the basis of a gain value given to a photographic image. Photographic images 314a and 314b are schematically depicted on the upper side of FIG. 8. Actually, a subject image appears in each of the photographic images 314a and 314b, but the image is omitted in FIG. 8 to facilitate the understanding, and further, singular points 316a and 316b to be detected are indicated by white rectangles.

Even if the same image sensor is used to take the photographic images, how a singular point appears in each of the photographic images depends on a gain value that is adjusted by an AD converter. For example, many singular points 316a appear in the photographic image 314a having a large gain value g because the difference from the remaining pixels is amplified. Inconspicuous and fewer singular points 316b appear in the photographic image 314b having a small gain value g because the difference from the remaining pixels is small.

In consideration of such an appearance characteristic of singular points, the detection condition control unit 66 adjusts a singular point detection condition in accordance with the gain value g. For example, in a case where the gain value g is greater than a prescribed threshold value $g_{th}$, the detection condition control unit 66 sets the upper limit and the lower limit of the numerical range within which the value of the target pixel is determined as a normal value, to the maximum value max and the minimum value min of the pixel values of the adjacent pixels. This condition is depicted on the lower left side in FIG. 8. On the other hand, in a case where the gain value g is equal to or less than the prescribed threshold value $g_{th}$, the detection condition control unit 66 expands the numerical range within which the pixel value of the target pixel is determined as a normal value.

That is, the detection condition control unit 66 increases the upper limit for determining the pixel value as a normal value by Δp, and decreases the lower limit by Δp'. The margin amounts p and p' may be equal to each other or may be different from each other. Optimal values of the margin amounts are obtained by experiment. As a result of such mitigation of the condition for determining the pixel value as a normal value, it is possible to reduce the possibility that, when the difference between an abnormal value and a normal value is not distinctively large, a pixel that depicts a true image is erroneously determined as an abnormal value and an unnecessary correction is made. A parameter for changing the detection condition is not limited to the gain value g, as previously explained. In addition, a change of the detection condition is not limited to two variations. The change may have three or more variations. Alternatively, the upper limit and the lower limit of a normal value may be continuously changed.

Figure 9:
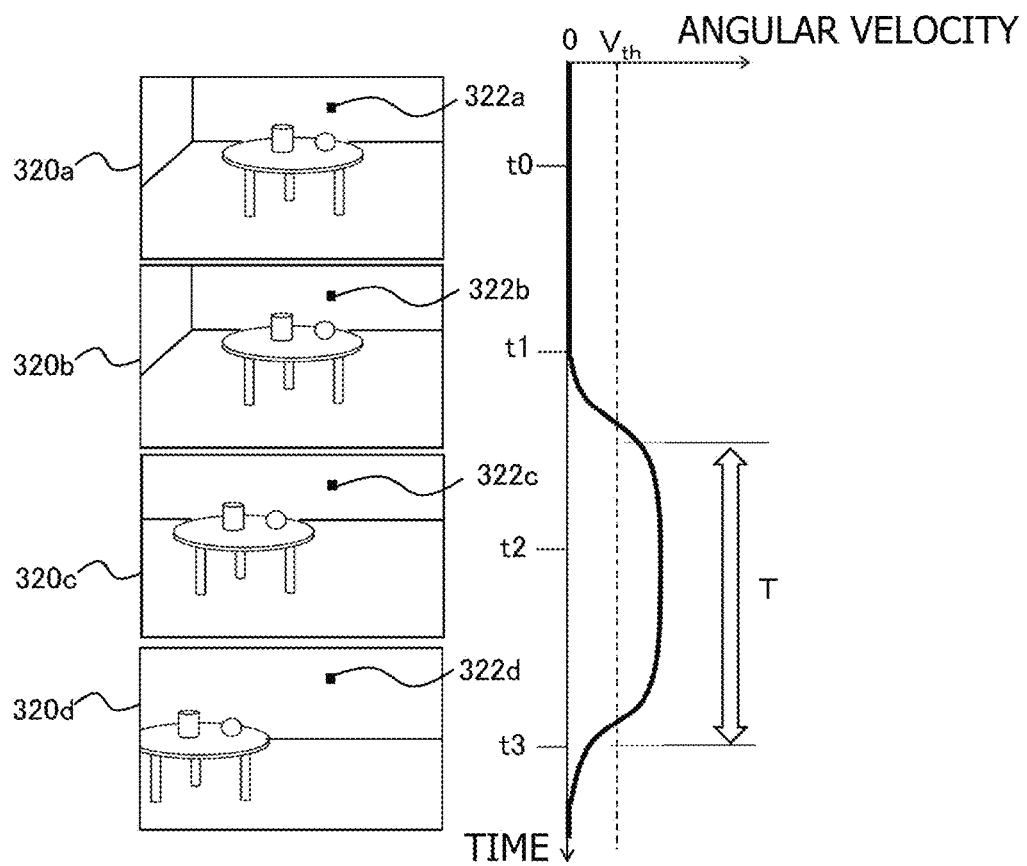
FIG. 9 is a diagram for explaining an example in which a defect position registration unit identifies the position of a pixel where a defect has occurs in an imaging element in the present embodiment.

FIG. 9 is a diagram for explaining an example in which the defect position registration unit 68 identifies the position of a pixel where a defect occurs in an imaging element. In FIG. 9, the longitudinal direction indicates a time axis, and transition of frames 320a, 320b, 320c, and 320d selected from among photographic image frames is schematically illustrated. The right side of FIG. 9 is indicative of a change in the angular velocity of the user's head. In the head-mount display 100, the visual field changes in accordance with movement of the user's head. In the example in FIG. 9, the user's face is turned to the right side from time t1 to t3, and a table which is a subject moves to the left side.

Singular points 322a, 322b, 322c, and 322d are generated in the frames 320a, 320b, 320c, and 320d respectively. The singular point detection unit 54 determines that these singular points have abnormal values, and the correction unit 56 corrects the pixel values. However, as illustrated in the frames 320a and 320b, the visual field does not change for a time period from time t0 to t1 during which the user's head does not move. Therefore, it is difficult to determine whether the singular points 322a and 322b depict a certain image in the real space, or the singular points 322a and 322b are caused by a defect in an imaging element.

In the time period from time t1 to t3 when the user's head is moving, the singular points 322b, 322c, and 322d are not displaced. Therefore, the imaging element has a defect in the corresponding position in the image sensor. As a result, the defect position registration unit 68 collects the detection results obtained by the singular point detection unit 54 during a time period T when the angular velocity or sped given by the movement information acquisition unit 64 is greater than a threshold value Vth.

For example, when a singular point is detected in the same pixel a prescribed number of times or greater, the defect position registration unit 68 registers the position of the pixel as a defect position. Accordingly, a pixel to be corrected can be identified with high precision, and the following operation of the singular point detection unit 54 can be omitted. Thus, the speed of correcting a defect can be increased.

Next, operation of a head-mount display that can be realized by the abovementioned configuration will be explained. FIG. 10 is a flowchart in which the head-mount display outputs data while correcting a singular point in a photographic image in the present embodiment. The steps of this operation are performed for each frame in a state where the user is wearing the head-mount display 100 and the stereo camera 110 is imaging a real space in front of the stereo camera 110.

This operation presupposes that data on a prescribed number of rows in photographic image frames acquired by the photographic image acquisition unit 50 are stored in the buffer memory 52. First, the singular point detection unit 54 determines one target pixel, and reads out a pixel block of a prescribed size centered around the target pixel (S10 and S12). In a case where a correction is made within a limited region being gazed by the user, the singular point detection unit 54 determines a target pixel within a prescribed range from the gaze point at S10.

For example, a 3×3 pixel block is first defined for the target pixel. The singular point detection unit 54 confirms that the position of the target pixel determined at S10 is unregistered as a defect position (Y at S14), and then, determines whether the pixel value of the target pixel is normal or abnormal, by comparing the target pixel with the adjacent pixels (S16). As previously explained, the singular point detection unit 54 may adjust the range for determining that the pixel value is normal, on the basis of a characteristic such as a gain value of the photographic image.

When the pixel value is determined as a normal value (Y at S18), the singular point detection unit 54 expands the pixel block, and then, determines whether the pixel value is normal or abnormal again (N at S20, Y at S12 and S14, S16). For example, a 5×5 pixel block is defined at the second step. In such a manner, the pixel block is expanded by multiple steps and whether the target pixel has a normal value or an abnormal value is determined repeatedly. If the target pixel is still determined to have a normal value after the pixel block is expanded by a prescribed number of steps (Y at S20), the singular point detection unit 54 outputs the pixel value of the target pixel to the output control unit 58 (S22).

Accordingly, the original value of the target pixel is used for a display process. It is to be noted that, in a case where the pixel block is not expanded, the determination at S20 is skipped. If the pixel of the target pixel is determined, at S16, as an abnormal value (N at S18), the correction unit 56 corrects the abnormal value through processing "A," which will be explained later, and outputs the corrected pixel value to the output control unit 58 (S22). In the head-mount display 100, all the pixels in the photographic image are determined as a target pixel, and then, steps S10 to S22 are basically repeated for each of the target pixels (N at S24). Accordingly, a singular point that appears in a photographic image frame can be corrected at high speed and with high precision before being displayed.

As previously explained, the singular point detection unit 54 and the correction unit 56 may parallelly process the different target pixels. In a case where pixels included only within the gaze region are correction targets, steps S14 to S20 for the remaining pixels can be skipped. That is, the singular point detection unit 54 reads out only the value of a target pixel from the buffer memory 52, and directly outputs the value to the output control unit 58 (S22).

After the output is completed for all the pixels in the photographic image, the head-mount display 100 finishes the processing for one frame (Y at S24). The process depicted in the flowchart is repeated for each photographic image frame. After a certain number of the frames are processed, the defect position registration unit 68 registers defect positions, in a manner that will be explained later.

After the registration, the correction unit 56 determines the pixel in the defect position as a target pixel at S10, and reads out a pixel block of a prescribed size centered around the target pixel (S10 and S20).

Since the target pixel is in the defective position (N at S14), the correction unit 56 corrects the value of the target pixel by using the pixel values of the adjacent pixels (S26), and outputs the corrected value to the output control unit 58 (S22). However, the singular point detection unit 54 may detect a singular point at S10 to S20 with a prescribed frequency, as previously explained. In this case, the defect position registration unit 68 may check whether or not the registered information includes an error on the basis of the detection result, and may correct the error if any.

Figure 11:
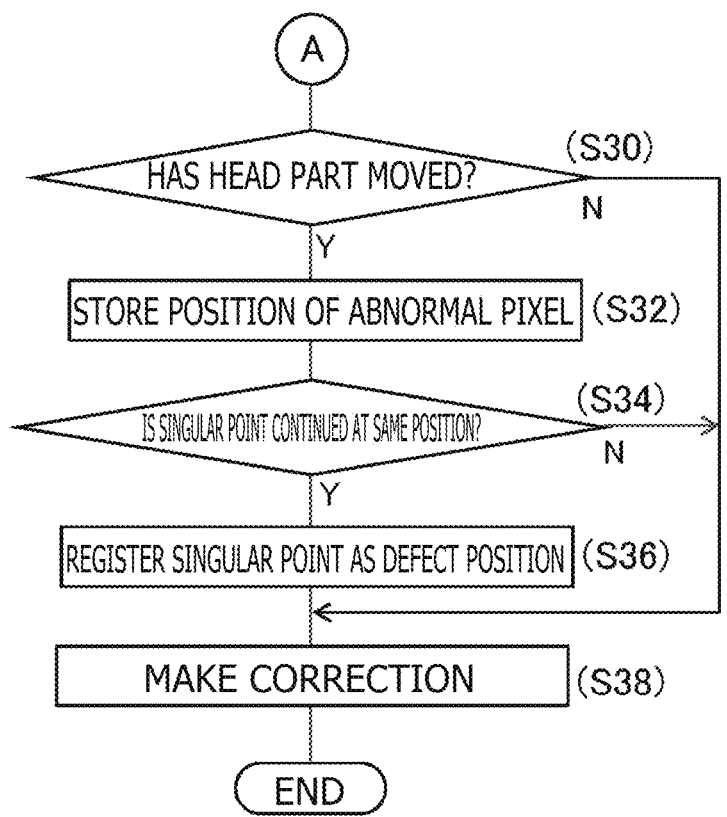
FIG. 11 is a flowchart depicting steps of processing "A" in FIG. 10.

FIG. 11 is a flowchart depicting steps of processing "A" in FIG. 10. This process is started if the value of the target pixel is determined as an abnormal value. First, the defect position registration unit 68 checks whether or not the head-mount display 100 or the head part has moved. If the head-mount display 100 has moved (Y at S30), the defect position registration unit 68 temporarily stores the position coordinates of the target pixel into a memory or the like (S32). If the position coordinates detected so far have been stored, the defect position registration unit 68 determines whether or not the singular point is considered to continuously appear in the same position (S34).

For example, if the singular point is detected in the same position throughout a prescribed number or more of frames, the defect position registration unit 68 determines that the singular point has continuity. If the position of the singular point has continuity (Y at S34), the defect position registration unit 68 registers the position of the singular point as a defect position (S36). If continuity is not determined (N at S34), the step for registering the defect position is skipped, and then, the correction unit 56 corrects the value of the target pixel by using the pixel values of the adjacent pixels (S38).

If the head-mount display 100 has not moved (N at S30), steps S32 to S36 are skipped, and then, the correction unit 56 corrects the value of the target value by using the pixel values of the adjacent pixels (S38). However, in a case where the continuity of the singular point is monitored without determining movement of the head-mount display 100, the determination at S30 is skipped. As a result of step S36, the flow to S26 in the flowchart of FIG. 10 is generated.

According to the present embodiment explained so far, a singular point that is generated due to a defect of an imaging element or the like is detected and corrected in a display device displaying a photographic image. To achieve this, whether a target pixel is normal or abnormal is determined by comparison of the pixel value of the target pixel with the pixel values of the adjacent pixels. When the target pixel is abnormal, the target pixel is corrected on the basis of the pixel values of the adjacent pixels. That is, a local determination and a local correction using data regarding a very small region are made. Accordingly, compared to common noise reduction filters, the present embodiment can suppress the effect on the resolution of the entire image. In addition, independent processes can be performed for respective target pixels, and the target pixels can be easily processed in parallel. Accordingly, high-speed processing using an existing GPU or VPU can be performed.

Further, a correction is made within a limited region on the basis of a user's gaze point in the plane of a photographic image. Accordingly, the effect regarding the visibility can be minimized, and the time period required to detect and correct a singular point for each frame can be shortened. In addition, the singular point detection condition is adjusted in accordance with a characteristic such as a gain value of the photographic image, and the detection is made multiple times while the range of adjacent pixels for use in the singular point detection is adjusted. Accordingly, a singular point can be detected and corrected with higher precision.

Moreover, the detection result may be monitored with time, and a singular point that continuously appears in the same position may be identified. In this case, the following operation for the correction is performed only on a pixel that is located in this position. As a result, the next or later detection of a singular point is omitted so that a time taken to display the photographic image can be reduced. In this case, a motion sensor or the like that is originally included in the head-mount display is used to collect the position of the singular point that is not displaced with respect to a change in the visual field. Accordingly, a true image is prevented from being erroneously detected as a singular point. According to the configuration explained so far, a high-quality photographic image can be displayed with a low delay irrespective of a resource amount.

The present disclosure has been explained on the basis of the embodiment. The embodiment exemplify the present disclosure but a person skilled in the art will understand that various modifications can be made to a combination of the constituent elements or the process steps and that these modifications are also within the scope of the present disclosure.

What is claimed is:

1. A display device comprising:
one or more processors; and
one or more memory devices storing instructions that, upon execution by the one or more processors, configure the display device to:
determine whether an allocated target pixel in a photographic image is a singular point which has a value outside a normal pixel value range which is defined by adjacent pixels;
when the value of the target pixel remains outside the normal pixel value range upon expanding a range of the adjacent pixels and re-defining the normal pixel value range, determine that the target pixel and any one of the adjacent pixels prior to the expanding the range of the adjacent pixels are singular points;
correct a value using values of adjacent pixels when the allocated target pixel is the singular point; and
output data regarding an image in which a value of the singular point has been corrected, to a display panel.

2. The display device according to claim 1, wherein the instructions that, upon execution by the one or more processors, further configure the display device to:
acquire a parameter concerning a characteristic of the photographic image; and
change the normal pixel value range in accordance with the parameter.

3. The display device according to claim 1, wherein the instructions that, upon execution by the one or more processors, further configure the display device to:
acquire a user gaze point in the photographic image being displayed; and,
define a target pixel within a prescribed range from the gaze point and determine whether the target pixel is a singular point.

4. The display device according to claim 1, wherein
a target pixel is defined within a prescribed range from a center of the photographic image being displayed, and

wherein the instructions that, upon execution by the one or more processors, further configure the display device to determine whether or not the target pixel is a singular point.

5. The display device according to claim 1, wherein the instructions that, upon execution by the one or more processors, further configure the display device to:
    identify and register a position of a defective imaging element by monitoring a position where the singular point is generated; and,
    correct a value of a pixel corresponding to a registered position using the values of the adjacent pixels.

6. The display device according to claim 5, wherein the instructions that, upon execution by the one or more processors, further configure the display device to define the position of the defective imaging element on a basis of the position of the singular point detected within a time period during which a visual field of the photographic image is considered to be changing.

7. The display device according to claim 6, further comprising:
    an integrated camera configured to capture the photographic image,
    wherein the instructions that, upon execution by the one or more processors, further configure the display device to:
    acquire movement information regarding the display device; and
    determine the time period during which the visual field is considered to be changing, on a basis of the movement information.

8. A head-mount display comprising:
    a display device configured to:
        determine whether an allocated target pixel in a photographic image is a singular point which has a value outside a normal pixel value range which is defined by adjacent pixels;
        when the value of the target pixel remains outside the normal pixel value range upon expanding a range of the adjacent pixels and re-defining the normal pixel value range, determine that the target pixel and any one of the adjacent pixels prior to the expanding the range of the adjacent pixels are singular points;
        correct a value using values of adjacent pixels when the allocated target pixel is the singular point; and
        output data regarding an image in which a value of the singular point has been corrected, to a display panel;
    a stereo camera configured to image a real space in a front direction; and
    a display panel configured to display the photographic image.

9. The head-mount display of claim 8, wherein the display device is further configured to:
    acquire a parameter concerning a characteristic of the photographic image; and
    change the normal pixel value range in accordance with the parameter.

10. The head-mount display of claim 8, wherein display device is further configured to:
    acquire a user gaze point in the photographic image being displayed; and
    define a target pixel within a prescribed range from the gaze point and determine whether the target pixel is a singular point.

11. The head-mount display of claim 8, wherein a target pixel is defined within a prescribed range from a center of the photographic image being displayed, and

wherein the display device is further configured to determine whether the target pixel is a singular point.

12. The head-mount display of claim 8, wherein the display device is further configured to:
    identify and register a position of a defective imaging element by monitoring a position where the singular point is generated; and
    correct a value of a pixel corresponding to a registered position using the values of the adjacent pixels.

13. The head-mount display of claim 12, wherein the display device is further confiugred to define the position of the defective imaging element on a basis of the position of the singular point detected within a time period during which a visual field of the photographic image is considered to be changing.

14. The head-mount display of claim 13, wherein the display device further comprises an integrated camera configured to capture the photographic image, and
    wherein the display device is further configured to:
        acquire movement information regarding the display device; and
        determine the time period during which the visual field is considered to be changing, on a basis of the movement information.

15. An image display method comprising:
    parallelly determining whether target pixels, in a photographic image, allocated to respective execution subjects are singular points which have values outside corresponding normal pixel value ranges which are defined by corresponding adjacent pixels;
    when a value of a target pixel of the target pixels remains outside the corresponding normal pixel value range upon expanding a range of the corresponding adjacent pixels and re- defining the corresponding normal pixel value range, determining that the target pixel and any one of the adjacent pixels of the target pixel prior to the expanding the range of the corresponding adjacent pixels are singular points;
    parallelly correcting a value of the target pixel allocated to a corresponding execution subject, using values of corresponding adjacent pixels when the target pixel is the singular point; and
    outputting data regarding an image in which the value of the singular point has been corrected, to a display panel.

16. The image display method of claim 15, further comprising:
    acquiring a parameter concerning a characteristic of the photographic image; and
    changing the normal pixel value range in accordance with the parameter.

17. The image display method of claim 15, further comprising:
    acquiring a user gaze point in the photographic image being displayed; and
    defining a target pixel within a prescribed range from the gaze point and determine whether the target pixel is a singular point.

18. The image display method of claim 15, further comprising:
    defining a target pixel within a prescribed range from a center of the photographic image being displayed; and
    determining whether the target pixel is a singular point.

19. The image display method of claim 15, further comprising:

identifying and registering a position of a defective imaging element by monitoring a position where the singular point is generated; and correcting a value of a pixel corresponding to a registered position using the values of the adjacent pixels.

20. A non-transitory computer-readable medium storing computer-readable instructions that, when executed by a computer, cause the computer to perform operations comprising:

parallelly determining whether target pixels, in a photographic image, allocated to respective execution subjects are singular points which have values outside corresponding normal pixel value ranges which are defined by corresponding adjacent pixels;

when a value of a target pixel of the target pixels remains outside the corresponding normal pixel value range upon expanding a range of the corresponding adjacent pixels and re- defining the corresponding normal pixel value range, determining that the target pixel and any one of the adjacent pixels of the target pixel prior to the expanding the range of the corresponding adjacent pixels are singular points;

parallelly correcting a value of the target pixel allocated to corresponding execution subject, using values of corresponding adjacent pixels when the target pixel is the singular point; and outputting data regarding an image in which the value of the singular point has been corrected, to a display panel.

\* \* \* \* \*